(12) United States Patent
Robinson

(10) Patent No.: US 10,048,958 B2
(45) Date of Patent: *Aug. 14, 2018

(54) LIVE DATA AS A SERVICE AND CORRESPONDING PROGRAMMING INFRASTRUCTURE

(71) Applicant: Marck R. Robinson, Redmond, WA (US)

(72) Inventor: Marck R. Robinson, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/610,442

(22) Filed: May 31, 2017

(65) Prior Publication Data
US 2017/0329600 A1    Nov. 16, 2017

Related U.S. Application Data

(63) Continuation of application No. 14/842,676, filed on Sep. 1, 2015, now Pat. No. 9,742,875, which is a continuation of application No. 14/458,807, filed on Aug. 13, 2014, now Pat. No. 9,134,985.

(60) Provisional application No. 61/865,519, filed on Aug. 13, 2013.

(51) Int. Cl.
| | |
|---|---|
| G06F 9/44 | (2018.01) |
| G06F 15/16 | (2006.01) |
| G06F 8/65 | (2018.01) |
| H04L 29/06 | (2006.01) |
| G06F 8/61 | (2018.01) |
| H04L 29/08 | (2006.01) |
| H04L 12/24 | (2006.01) |
| H04L 12/26 | (2006.01) |
| G06F 17/30 | (2006.01) |

(52) U.S. Cl.
CPC .............. *G06F 8/65* (2013.01); *G06F 8/61* (2013.01); *G06F 17/30899* (2013.01); *H04L 41/22* (2013.01); *H04L 43/00* (2013.01); *H04L 67/02* (2013.01); *H04L 67/42* (2013.01)

(58) Field of Classification Search
CPC ........ G06F 8/61; G06F 8/65; G06F 17/30899; H04L 41/22; H04L 43/00; H04L 67/02; H04L 67/42
USPC .......................... 717/168–178; 709/201–203
See application file for complete search history.

(56) References Cited

U.S. PATENT DOCUMENTS

| | | |
|---|---|---|
| 5,956,509 A | 9/1999 | Kevner |
| 6,289,390 B1 | 9/2001 | Kavner |
| 6,430,607 B1 | 8/2002 | Kavner |
| 6,542,908 B1 | 4/2003 | Ims |
| 6,769,123 B1 | 7/2004 | Chan |
| 7,890,487 B1 | 2/2011 | Hess et al. |
| 2006/0116991 A1 | 6/2006 | Calderwood |

*Primary Examiner* — Qing Chen
(74) *Attorney, Agent, or Firm* — Ellen M. Bierman; Lowe Graham Jones PLLC

(57) ABSTRACT

Techniques for live data management are described. Some embodiments provide a Live Data Management System ("LDMS") that provides a facility for managing live data objects and for efficiently developing client-server applications that utilize such live data objects. Live data objects are modules of computation that exist on both a client side and server side portion of a client-server application. Live data objects are configured to monitor changes to data hosted on or accessible via the server side, and to automatically update the client side without the need for polling or other requests made by the client side. The described techniques facilitate efficient software development of Web-based client server applications.

19 Claims, 13 Drawing Sheets

Fig. 3B

*3200:* The process of *3100*, wherein the instantiating a server portion of the client-server application includes:

> *3201:* instantiating a database for execution on the first computing system, the database defined by the received string

> *3202:* instantiating a proxy application for execution on the first computing system, the proxy application configured to perform functions defined by the received string

Fig. 3C

*3300:* The process of *3100*, wherein the instantiating a server portion of the client-server application includes:

> *3301:* instantiating a server-side live data object for execution on the first computing system, wherein the live data object is configured to transmit the updates to a corresponding client-side live data object executing on the second computing system

Fig. 3D

3400: The process of *3100*, further comprising:

3401: determining that code corresponding to the server portion has been modified

3402: in response to determining that the code has been modified, automatically replacing the server portion with the modified server portion, such that a developer of the modified server portion need not manually access the server in order to stop, replace, and/or restart the server portion

Fig. 3E

3500: The process of *3100*, further comprising:

3501: receiving the string a second time

3502: determining that the string is unchanged, and in response, not replacing or restarting the server portion

Fig. 3F

3600: The process of 3100, wherein the receiving a string includes:

3601: receiving the string from a Web client that executes on the second computing system and that loads a single page that defines both the client portion and the server portion, by defining a database, a proxy application, and a server-side live data object corresponding to the server portion

Fig. 3G

3700: A process for facilitating development of client-server applications

3701: at a first computing system, instantiating a client-server application, by:

3702: providing a page that defines both a client portion and a server portion of the client-server application

3703: receiving a string from the client portion of the client-server application, the client portion executing on a second computing system, the string encoded with data used to mirror facilities of the client portion of the client-server application

3704: instantiating a server portion of the client-server application based on the received string, the server portion executing on the first computing system and containing functions that are proxies for functions available in the client portion of the client-server application

Fig. 3H

*3800*: The process of *3700*, wherein the receiving a string includes:

*3801*: receiving the string from a Web client executing on the second computing system, wherein the Web client loads the page and transmits the string to the first computing system, wherein the page includes code that defines the database and corresponding views, code that defines functions performed by the proxy application, and code that defines functions performed by the server-side live data object to transmit updates to the database to a client-side live data object that executes within the Web client

Fig. 3I

*3900*: The process of *3700*, further comprising:

*3901*: determining that code corresponding to the server portion has been modified

*3902*: in response to determining that the code has been modified, automatically replacing the server portion with the modified server portion, such that a developer of the modified server portion need not manually access the server in order to stop, replace, and/or restart the server portion

Fig. 3J

31000: The process of 3900, further comprising:

31001: receiving from the second computing system a second string that represents the modified server portion

31002: in response to receiving the second string, automatically replacing the server portion

Fig. 3K

31100: The process of 3700, further comprising:

31101: receiving an indication that the client-server application is in developer mode

31102: in response to the received indication, automatically replacing the server portion every time the code corresponding to the server portion is modified

LIVE DATA AS A SERVICE AND CORRESPONDING PROGRAMMING INFRASTRUCTURE

CROSS-REFERENCE TO RELATED APPLICATIONS

This application is a continuation of U.S. application Ser. No. 14/842,676 (now U.S. Pat. No. 9,742,875), entitled "LIVE DATA AS A SERVICE AND CORRESPONDING PROGRAMMING INFRASTRUCTURE," filed Sep. 1, 2015, which is a continuation of U.S. application Ser. No. 14/458,807 (now U.S. Pat. No. 9,134,985), entitled "LIVE DATA AS A SERVICE AND CORRESPONDING PROGRAMMING INFRASTRUCTURE," filed Aug. 13, 2014, which claims the benefit of U.S. Provisional Application No. 61/865,519, entitled "LIVE DATA AS A SERVICE AND CORRESPONDING PROGRAMMING INFRASTRUCTURE," filed Aug. 13, 2013, all of which applications are incorporated herein by reference in their entireties.

TECHNICAL FIELD

The present disclosure relates to methods, techniques, systems, and frameworks for live data management and corresponding techniques for facilitating efficient software development of Web-based client server applications.

BRIEF DESCRIPTION OF THE DRAWINGS

FIGS. 3A-3K are flow diagrams of live data management processes performed by example embodiments.

DETAILED DESCRIPTION

Figure 1A:
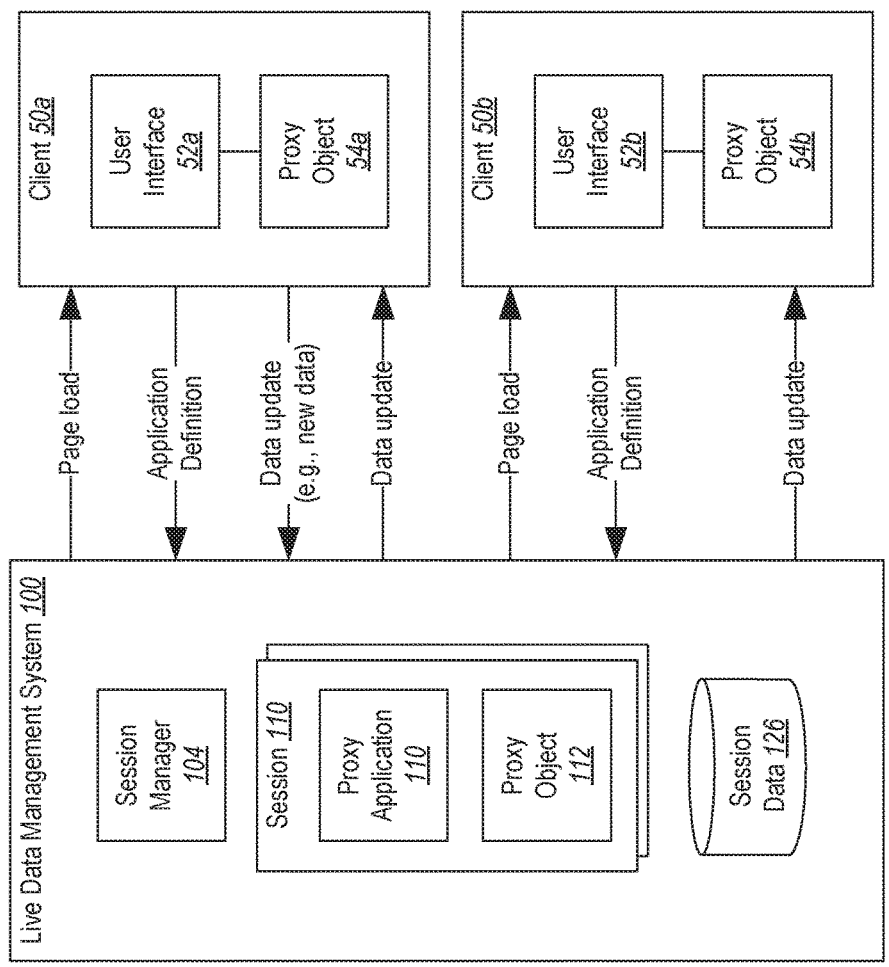
FIG. 1A is a block diagram of a live data management system according to an example embodiment.

Embodiments described herein provide enhanced computer and network-based methods, techniques, and systems for live data management. The described techniques provide a framework for efficient software application development of client-server applications that use live data objects. Live data objects are objects that exist on both a client side and server side portion of a client-server application. Live data objects are configured to monitor changes to data hosted on (or accessible via) the server side, and to automatically update the client side without the need for polling or other requests made by the client side. More specifically, the server side live data object continuously monitors information and generates events, which can be handled by the client side by way of callbacks or similar mechanisms. The client side receives events that it desires to handle and incorporates newly received data as desired. The server side can work with dynamically changing data that is stored in one or more databases (relational or otherwise) and/or other sources or types of data, including files, sensor data, or the like.

The described techniques also support or provide an application development framework. In this framework, the software developer can code both the client and server side portions of the client-server application together in a single source code module using libraries or other shared code provided by a live data management system or other source. In some embodiments, the shared code supports the ability to instantiate a live object on the server based on code and/or data received from the client portion. More particularly, the client portion initially loads a Web page or other data that includes code defining the client-server application. Then, the client portion transmits to the server code and/or data that defines the server portion of the application. In response and based on the received server code, the server instantiates the server portion of the application, including by instantiating data bases, tables, and/or related data sources; instantiating server application code; instantiating live data objects; and initiating any bookkeeping operations, such as application tracking, message dispatching, and the like.

The described techniques facilitate the efficient implementation of the model-view-controller ("MVC") design pattern in the client-server context. In particular, a developer defines the operation of all three elements of the model-view-controller pattern within a single source file or other module. For example, the single source file may define the "model," by defining database schemas and corresponding operations for managing the application state. The single source file may further define the "controller," by defining the operations performed on the server side to operate upon the model. Finally, the single source file may further define the "view," by defining database views for accessing the data on the server side and/or the user interface controls that are to be displayed on the client side for presentation of the application and its corresponding data.

The described techniques for client-server application development are at least in part facilitated by the live data object. In particular, live data objects free the software developer from needing to craft code to manage, monitor, and effectuate the transmission of data updates between the client and server portions of the application. Instead, the developer needs only to specify the types of changes or updates of interest in order to receive automatic notifications of changes and/or other updates that occur with respect to data hosted on or managed by the server portion of the application.

1. Example Live Data Management System Overview

FIG. 1A is a block diagram of a live data management system according to an example embodiment. In particular, FIG. 1A shows an example live data management system ("LDMS") 100 that is interacting with two clients 50a and 50b. The LDMS 100 includes a session manager 104, sessions 110, and session data 126. Each session 110 includes a proxy application 110 and a proxy object 112. The clients 50a and 50b each include a corresponding user interface 52a and 52b and proxy object 54a and 54b. The proxy objects are examples of live data objects. As will be described further below, the LDMS 100 cooperates with the clients 50a and 50b to implement a client-server application that manipulates data stored in the session data 126.

In the illustrated example, the first client 50a initially performs a page load to receive a Web page or other data from the LDMS 100. The loaded page need not necessarily be hosted by the LDMS 100, and can instead be provided by some third-party system. The loaded page includes contents (e.g., code, instructions, specifications, and/or data) that define the client-server application. Upon loading the page, the client 50a transmits an application definition (also called an "application context") to the LDMS 100. The client 50a also generates, based on the contents of the page, the user interface 52a and the proxy object 54a.

Upon receipt of the application definition by the LDMS 100, the session manager 104 creates a new session 110. In particular, the session manager 104 executes or interprets the received application definition and in response, generates a new session 110 and generates any necessary tables and views in the session data 126. In the language of the MVC paradigm, the session data 126 thus operates as the model. The new session 110 includes a proxy application 110 and a proxy object 112. In the language of the MVC paradigm, the proxy application 110 functions as the controller. The proxy object 112 is responsible for monitoring changes to the session data 126 and/or its schema and transmitting updates to the proxy object 54a.

Next, the second client 50b performs a page load to receive the same Web page (or other data) provided to the client 50a. As described with respect to client 50a, client 50b similarly creates the user interface 52b and proxy object 54b. In one embodiment, the client 50b also transmits the application definition to the LDMS 100, which creates a corresponding session 110 for the client 50b. The session 110 for client 50b also includes a proxy application and a proxy object (not shown) that are dedicated to serving the client 50b.

Since clients 50a and 50b are in this example sharing the session data 126, the initialization performed by the LDMS with respect to the client 50b differs slightly as compared to client 50a. In particular, since the structure of the session data 126 (e.g., its tables and database views) has already been defined by the earlier initialization performed with respect to client 50a, the session manager 104 need not perform those operations again on behalf of client 50b.

In other embodiments, the clients 50a and/or 50b need not necessarily transmit the application context to the LDMS 100. In such embodiments, the application context may be loaded from a database of the LDMS 100 or other source (e.g., file system) based on the request (e.g., as defined by a URL and associated parameters) made by a client.

Some embodiments may support the caching of application contexts. For example, when client 50a initially transmits the application definition to the LDMS 100, the LDMS 100 may cache the application context in a database or other storage. Then, when client 50b initializes the application (e.g., on page load), the LDMS 100 may determine whether the application has been modified (e.g., by comparing modification dates or code signatures/digests). If the application has not been modified, the LDMS 100 utilizes the cached application context; if so, the LDMS 100 obtains the modified application from the client 50b, performs the necessary initializations, and stores the application context in the cache for future access. Such an embodiment would provide benefits during application development and prototyping, in that any modification to the application would be reloaded, while providing efficiency by not needlessly reloading unmodified applications.

Next, a user of client 50a operates the user interface 52a to interact with the client portion of the client-server application. For example, the user may add, modify, or delete data presented by the user interface 52a. In response, the user interface 52a causes the proxy object 54a to transmit the update (e.g., new data) to the LDMS 100. The proxy application 110 receives the data update, which is then reflected in the session data 126.

In response to data updates made to the session data 126, the proxy object 112 of each of the sessions 110 transmits the data update to its corresponding client 50a or 50b. The data update is then received by proxy object 54a and 54b, and in turn reflected by the corresponding user interface 52a and 52b. In this manner, any update to the session data 126 is automatically forwarded to every client interacting with the client-server application. For example, if the client 50b deletes a data item via the user interface 52b, the client 50a will be notified of the deletion so that it can be presented via the user interface 52a.

Figure 1B:
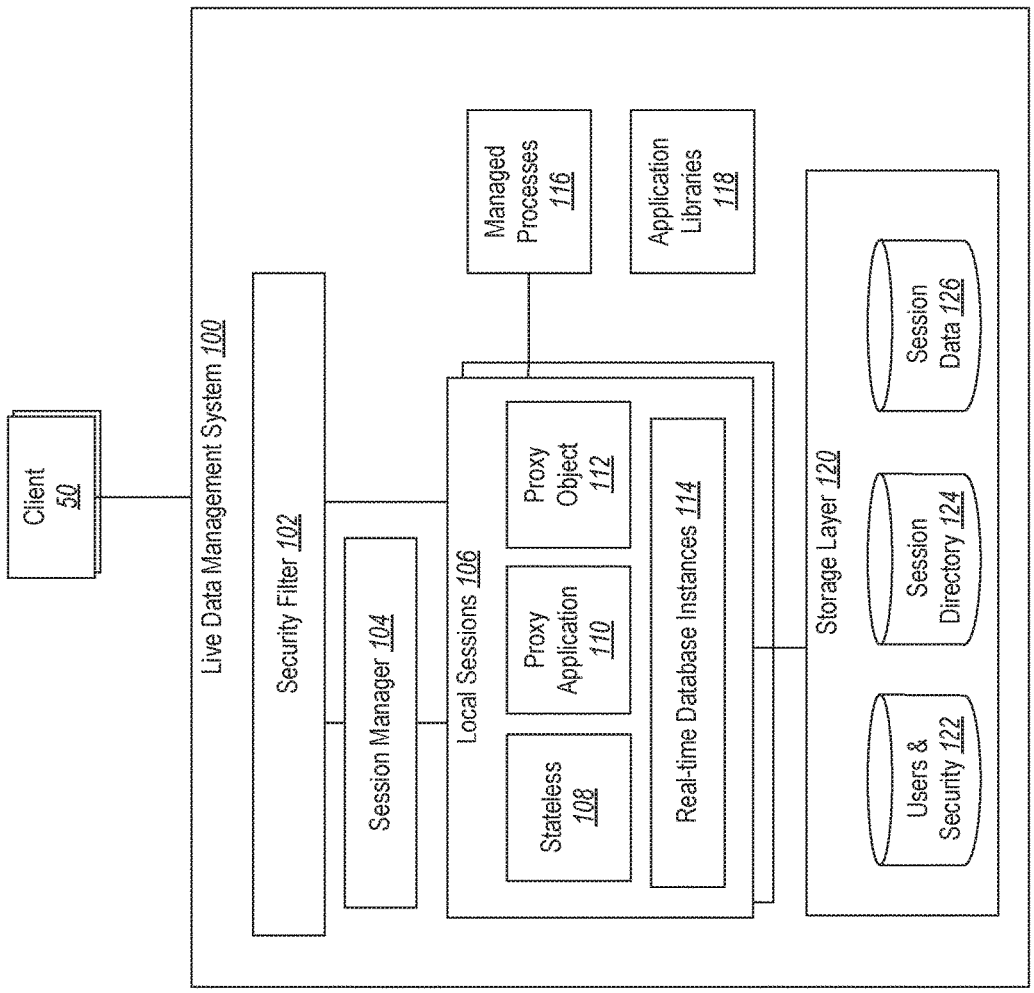
FIG. 1B is a block diagram that provides a detailed view of a live data management system according to an example embodiment.

FIG. 1B is a block diagram that provides a detailed view of a live data management system according to an example embodiment. This view shows additional modules of an example LDMS 100 interacting with clients 50. In other embodiments, the LDMS 100 may include other modules and/or be differently organized.

The illustrated LDMS 100 includes a security filter 102, a session manager 104, multiple local sessions 106, managed processes 116, application libraries 118, and a storage layer 120. The storage layer 120 includes user and security data 122, a session directory 124, and session data 126.

The security filter 102 is responsible for restricting access to authorized users. Information about authorized users and the types of operations they are permitted to perform is stored as user and security data 122.

The session manager 104 is responsible for managing the creation and destruction of sessions 106. The session manager 104 also dispatches incoming and outgoing messages or other transmissions (e.g., updated data) between the clients 50 and the corresponding local sessions 106. The session manager 104 records information (e.g., identifiers) of new sessions in the session directory 124.

The local sessions 106 each manage resources associated with one of the clients 50. Each local session 106 includes a stateless module 108, a proxy application 110, a proxy object 112, and a real-time database instance 114. The stateless module 108 includes any objects/code that do not need any state to be maintained between requests. Such stateless objects may be used to answer questions, such as application version numbers, or to access resources, such as images and other static data. Other such stateless objects may provide authentication functions, math functions, or the like.

The proxy application 110 is a component of the overall application that is responsible for performing the core server-side operations of the client-server application. Proxy applications exist and execute for the entire life span of the overall application.

The proxy object 112 is a live data object that is responsible for forwarding data updates between the session data 126 and a corresponding client 50. The elements of the local session 106 are defined by code and/or data received from the client 50, as described with respect to FIG. 1A, above.

The application libraries 118 include shared code that is used to implement functions within the LDMS 100 and/or the clients 50. For example, the shared libraries 118 may include infrastructure code for defining and implementing client-server applications that use proxy objects.

The managed processes 116 include server-side processes that correspond to local sessions 106. The managed processes 116 typically connect to third-party applications or directly to external systems. In an example deployment that provides live data services for an electronic power simulation engine, the managed processes 116 provide glue between an application a variety of third-party tools, utilities, and services.

Note that although the LDMS 100 is here shown as a stand-alone system, it may also or instead be deployed in other ways. For example, the LDMS 100 may be deployed within or behind a Web server or other type of application server that provides a front end for interacting with the LDMS 100. In this way, the LDMS 100 may be deployed in the context of a larger system, such as an e-commerce system, a customer relationship management system, or the like.

2. Example Client Server Applications

FIGS. 2A-2D are user interface screens provided by example client-server applications provided by an example embodiment. In particular, FIGS. 2A-2D represent user interfaces for four successive versions of a chat application implemented using the described techniques. The user interfaces and applications shown in FIGS. 2A-2D are respectively defined by computer program Listings 1-4, included below. As described further below, each illustrated application adds features to the version of the application shown in the preceding figure.

Figure 2A:
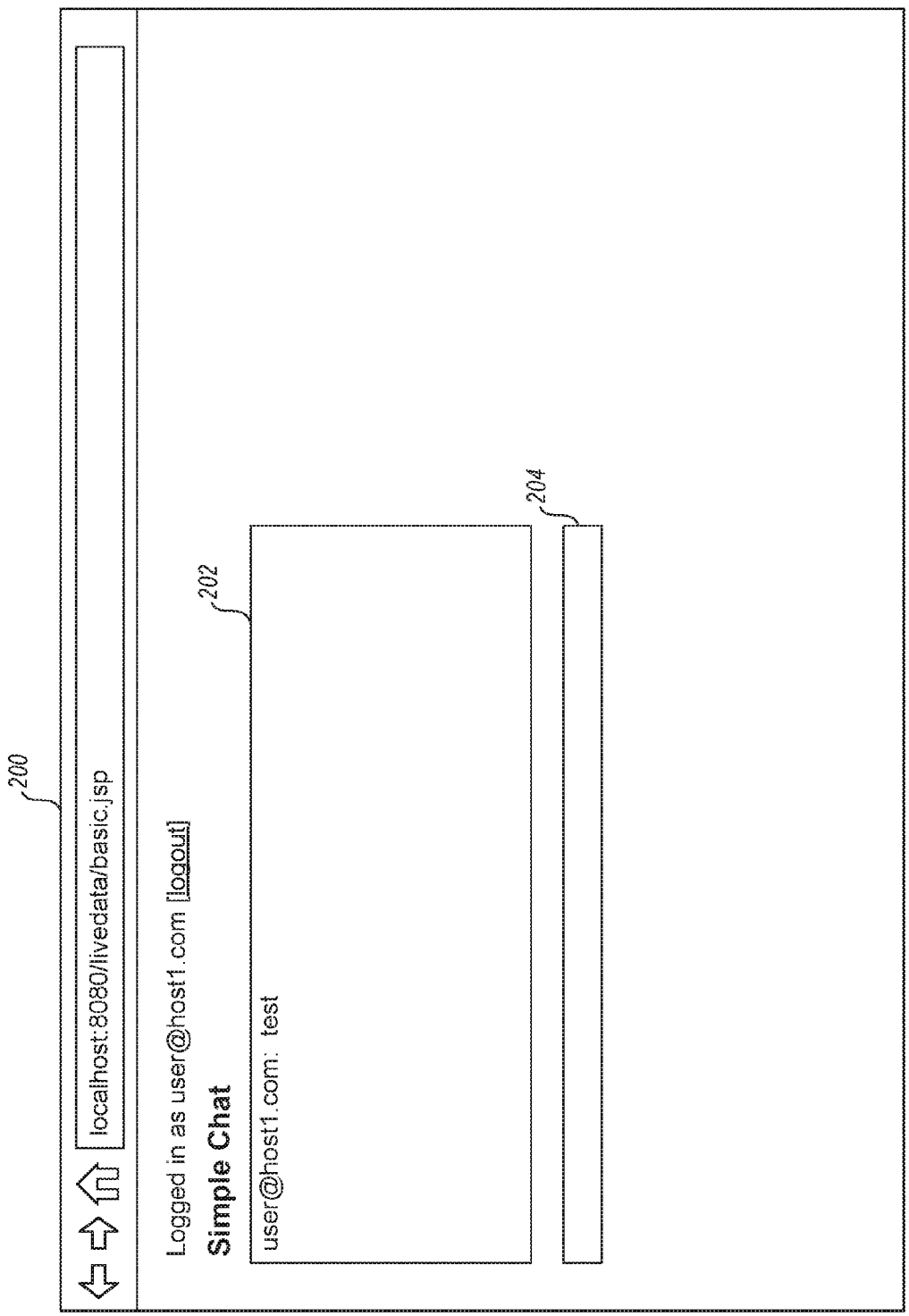
FIGS. 2A-2D are user interface screens provided by example client-server applications provided by an example embodiment.

FIG. 2A shows a first user interface screen 200 provided by a first version of the chat application. The screen 200 includes a chat history area 202 and a chat input control 204. A current user (displayed as user@host1.com) can enter chat messages into the chat input control 204. These messages are transmitted to the server portion of the application and reflected in the chat history area 202.

The chat room application of FIG. 2A is defined by computer program Listing 1, below. Listing 1 is a listing of a Java Server Page that includes JavaScript code for defining the illustrated chat room application. The Java Server Page shown in Listing 1 is loaded by a client Web browser. The code in lines 15-62 is substantially directed to defining the operation of the server portion of the client-server chat application. In particular, lines 17-36 define the tables and entities that represent the MVC model and are stored in a database hosted by the server as session data. Lines 43-51 define a handler for adding new values (e.g., chat messages) to the database. Line 53 requests that all data events be forwarded by the live data object (proxy object) on the server side. Lines 56-61 define an event handler for entering new chat messages into the database. Lines 83-89 define the client side user interface shown in FIG. 2A, including user interface elements 202 and 204.

Figure 2B:
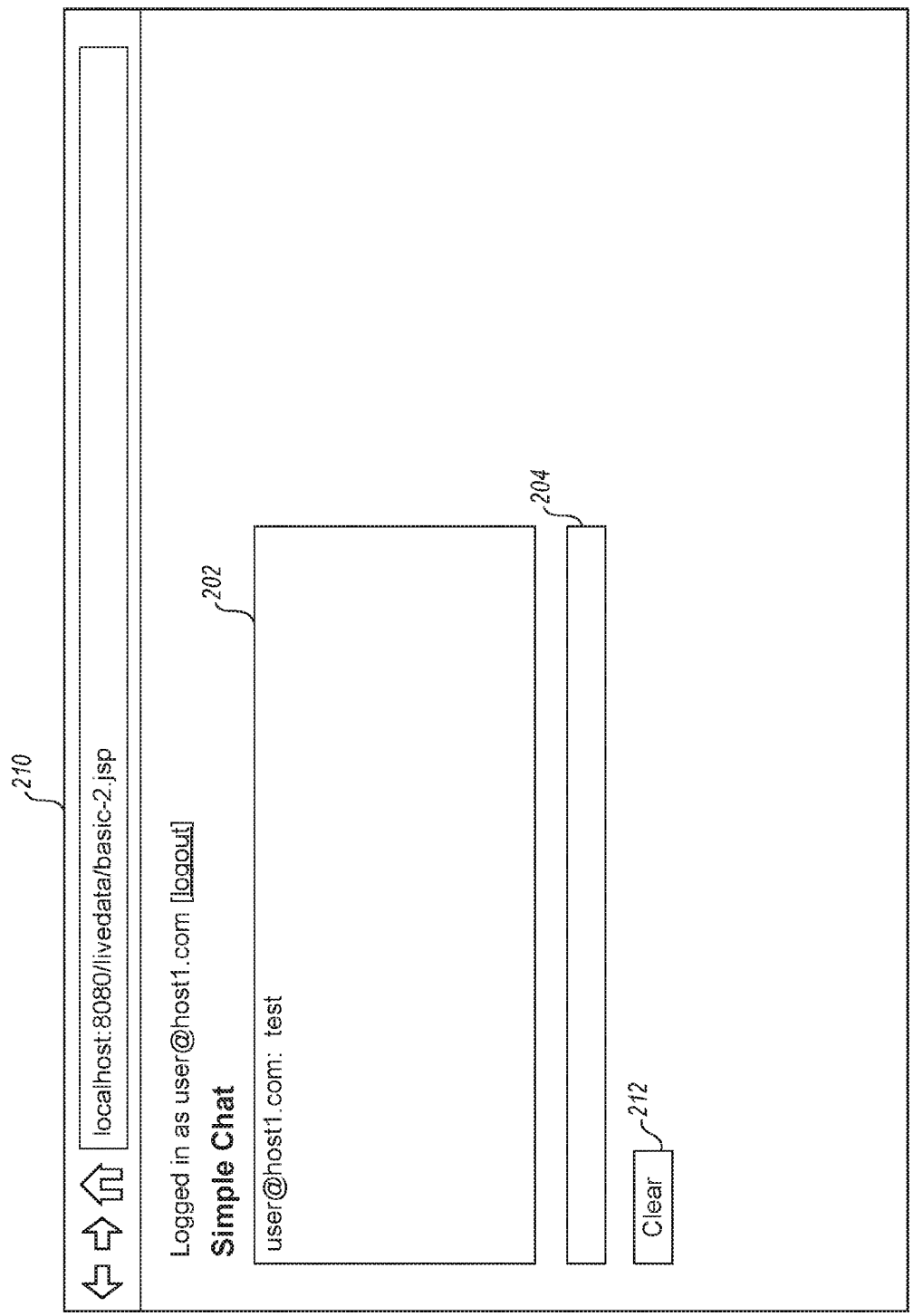

FIG. 2B shows a second user interface screen 210 provided by a second version of the chat application. The screen 210 includes the chat history area 202 and the chat input control 204 described with reference to FIG. 2A. The screen 210 also includes a clear button 212 that causes the messages stored by the server portion of the client server application to be deleted and this deletion to be reflected in the chat history area 202.

The chat room application of FIG. 2B is defined by computer program Listing 2, below. Listing 2 is a listing of a Java Server Page that includes JavaScript code for defining the illustrated chat room application. The Java Server Page show in Listing 2 adds functionality to the code of Listing 1. For example, lines 35-38 add a clear function that operates to remove messages associated with a specified user. This function is invoked on the server side in response to user activation of the clear button 212.

Figure 2C:
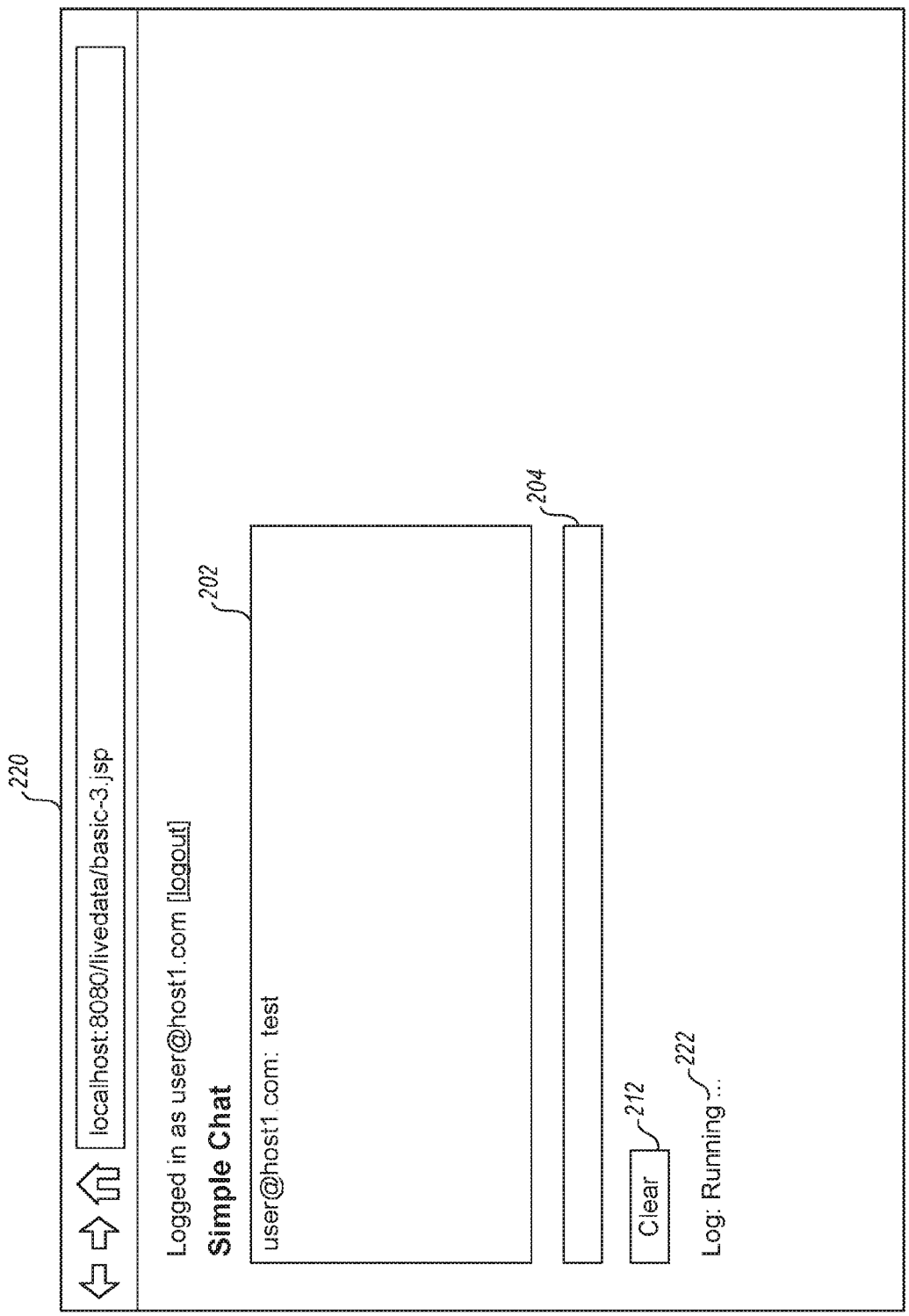

FIG. 2C shows a third user interface screen 220 provided by a third version of the chat application. The screen 220 includes the chat history area 202 and the chat input control 204 described with reference to FIG. 2A. The screen 220 also includes the clear button 212 described with respect to FIG. 2B. The screen 220 further includes a log message 222 that reflects that status and/or contents of a log that is managed by the server portion of the client server application.

The chat room application of FIG. 2C is defined by computer program Listing 3, below. Listing 3 is a listing of a Java Server Page that includes JavaScript code for defining the illustrated chat room application. The Java Server Page shown in Listing 3 adds functionality to the code of Listing 2. For example, lines 42-59 define the log as a live data object having corresponding methods/functions, including init, shutdown, refresh, and eventcb (an event call back).

Figure 2D:
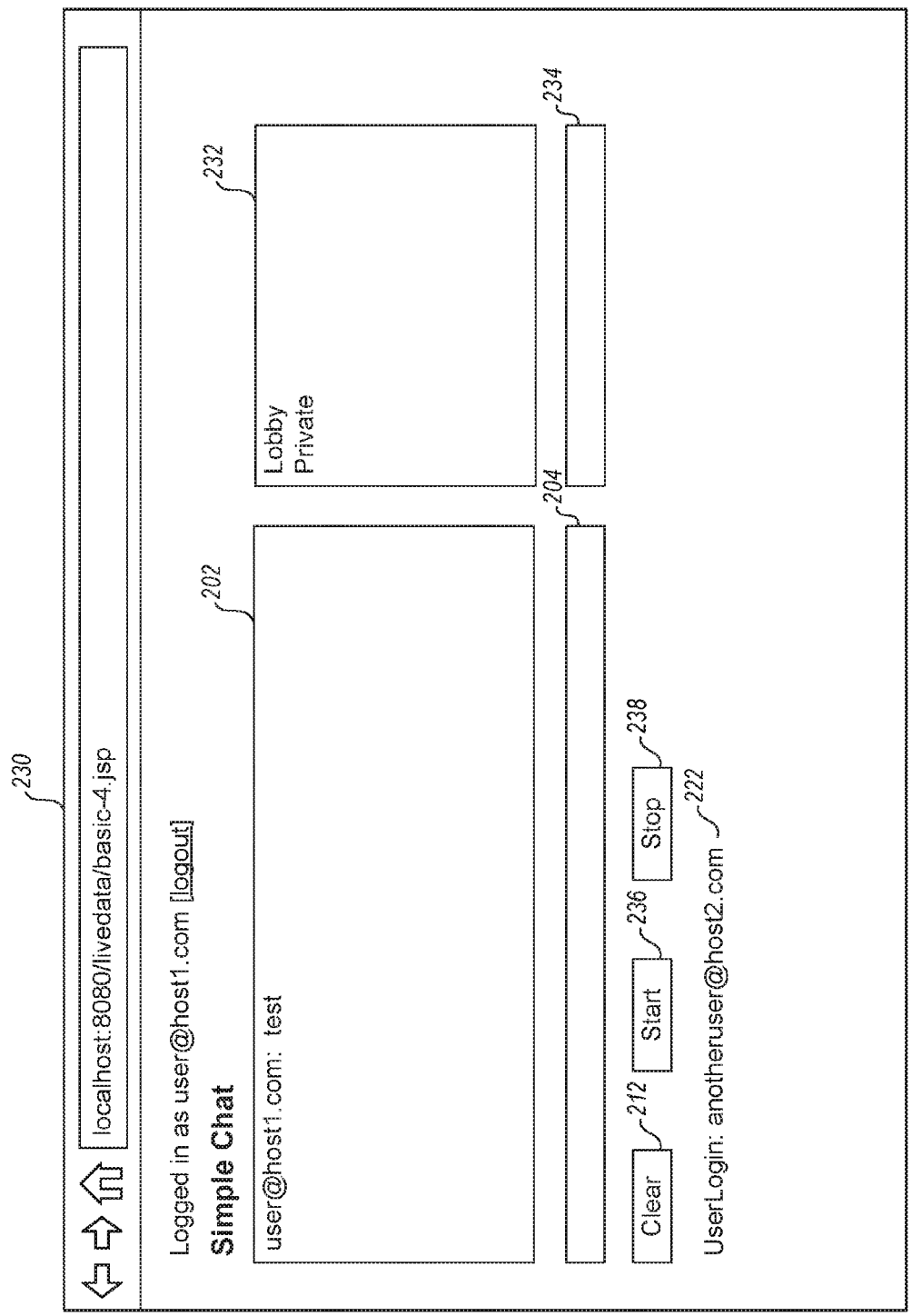

FIG. 2D shows a fourth user interface screen 230 provided by a fourth version of the chat application. The screen 230 includes the chat history area 202 and the chat input control 204 described with reference to FIG. 2A. The screen 230 also includes the clear button 212 described with respect to FIG. 2B, and the log message 222 described with respect to FIG. 2C. The screen 230 further includes a second chat history area 232 and a corresponding input control 234. The added history area 232 and input control 234 together form a second chat room.

The screen 230 also includes a start button 236 and a stop button 238. The start button 236 is configured to start the log by sending the appropriate message to the server portion of the client-server application. The stop button 238 is configured to stop the log by sending the appropriate message to the server portion of the client-server application.

The chat room application of FIG. 2D is defined by computer program Listing 4, below. Listing 4 is a listing of a Java Server Page that includes JavaScript code for defining the illustrated chat room application. The Java Server Page shown in Listing 4 adds functionality to the code of Listing 3. For example, lines 28-33 add a chat room table. Lines 61-77 define corresponding functions for tracking and managing chat rooms.

Note that only a small amount of code was added to each successive version of the chat room application described above. The source code demonstrates an iterative software development process in which the developer codes both the client and server side portions in a single source module. When this module is executed by the client (e.g., a Web browser), the server code portion is transmitted to the server, where it is executed.

The described techniques also facilitate a dynamic development cycle by automatically re-instantiating the server portion in response to code modifications. In particular, when the developer makes changes (e.g., adds a new feature), he need only modify the source module because when the module is again executed by the client, the modified server code portion will be transmitted to the server, where it will automatically replace any previously instantiated server code portion. As noted above, modified server code portion may be retransmitted on every instantiation, or alternatively, a caching scheme may be deployed so that code is only retransmitted when it is modified. During development, the developer is thus freed from manually accessing the server in order to stop, replace, and restart the server code portion, or otherwise perform any management tasks on the server. This dynamic, iterative mode of software development facilitated by the described techniques yields great efficiencies in the rate, flexibility, responsiveness, and expressiveness of the software development process.

Note that although JavaScript is used herein for illustrative purposes, the techniques are not limited to JavaScript or to any particular programming language or architecture. Nor do the techniques require the use of Java Server Pages or related technology. In other embodiments, other types of dynamic Web programming, servlet containers, application servers, or the like may be employed.

3. Example Processes

FIGS. 3A-3K are flow diagrams of live data management processes performed by example embodiments.

Figure 3A:
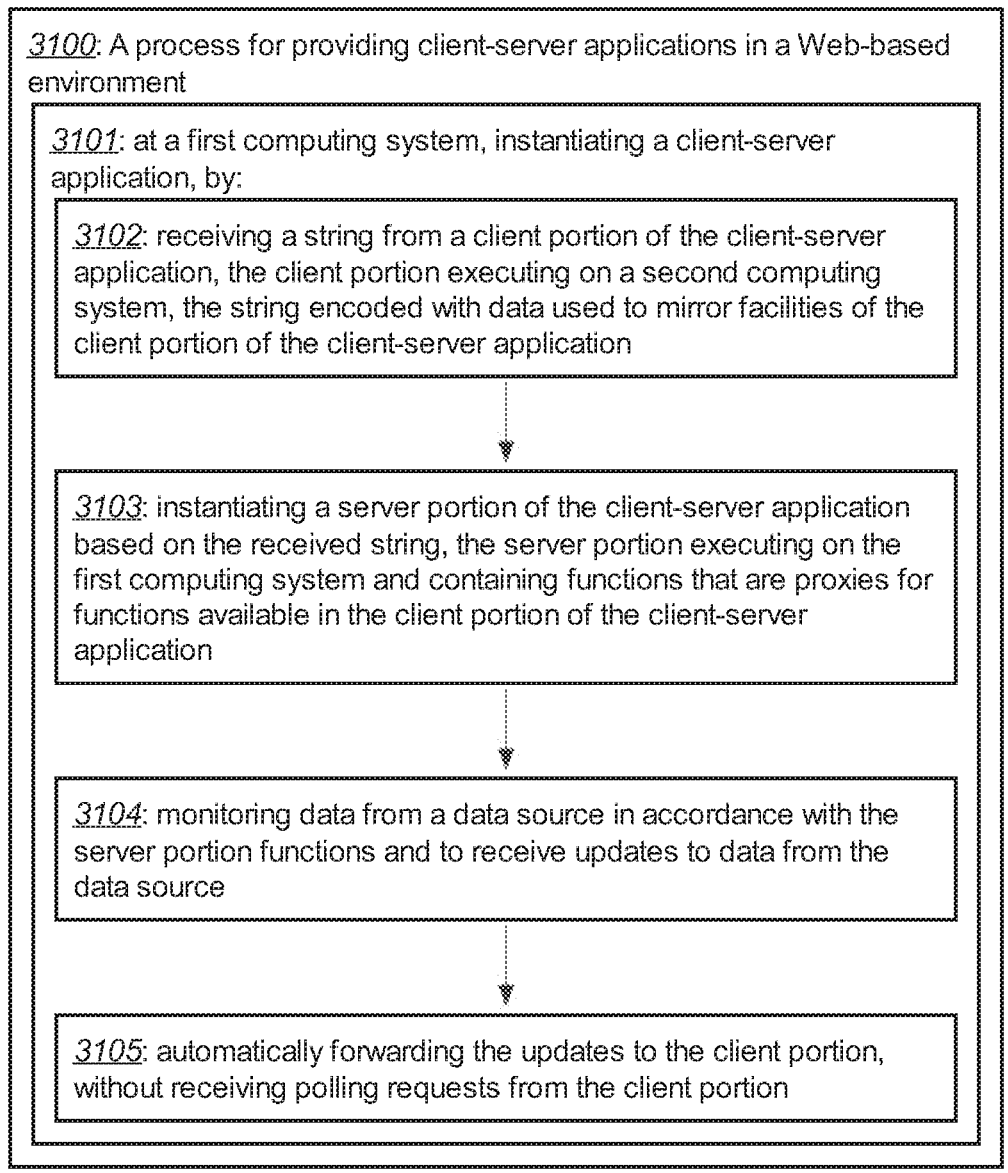

FIG. 3A is an example flow diagram of example logic for providing client-server applications in a Web-based environment. The illustrated logic in this and the following flow diagrams may be performed by, for example, one or more modules of the LDMS 100 described with respect to FIGS. 1A and 1B, above. More particularly, FIG. 3A illustrates a process 3100 that includes operations performed by or at the following block(s).

Block 3101 includes at a first computing system, instantiating a client-server application, by: performing operation(s) of block(s) 3102, 3103, 3104 and 3105, described below. The client-server application is typically instantiated by a server computing system that hosts an example LDMS and that interacts with one or more clients. The LDMS is configured to instantiate and manage server portions of client-server applications, along with associated live data objects that automatically reflect data updates to one or more clients interacting with the server system.

Block 3102 includes receiving a string from a client portion of the client-server application, the client portion executing on a second computing system, the string encoded with data used to mirror facilities of the client portion of the client-server application. The received string is typically encoded with instructions that define or otherwise specify the data structures and operations of the server portion of the client-server application. The received string is in some embodiments transmitted by a Web browser or other Web-capable client application executing on the second computing system. The string is transmitted by the second computing system in response to loading a page that includes code (e.g., JavaScript) that defines the client-server application. The string may be encoded in various ways, such as via Base64 encoding, or similar. In other embodiments, arbitrary binary data may be received instead of (or in addition to) the string.

Block 3103 includes instantiating a server portion of the client-server application based on the received string, the server portion executing on the first computing system and containing functions that are proxies for functions available in the client portion of the client-server application. Instantiating the server portion may include generating a session 106, along with corresponding proxy applications, objects, and database tables and views, as specified by the received string. If the server portion already exists (e.g., because it has been previously created by another client), then a session with a proxy application and related objects will be created, but new database structures will not.

Block 3104 includes monitoring data from a data source in accordance with the server portion functions and to receive updates to data from the data source. Monitoring the data from the data source may include creating a live data object (proxy object) that is configured to track changes to an underlying database, file, sensor, or other source of data. The types of data events captured by the live data object are typically also specified via the received string.

Block 3105 includes automatically forwarding the updates to the client portion, without receiving polling requests from the client portion. Forwarding the updates typically involves transmitting to the second computing device notifications or other messages that reflect changes to the monitored data. Some embodiments use AJAX (Asynchronous JavaScript and XML) to "push" such notifications to the client portion without requiring any polling or other request from the client portion.

FIG. 3B is an example flow diagram of example logic illustrating an example embodiment of process 3100 of FIG. 3A. More particularly, FIG. 3B illustrates a process 3200 that includes the process 3100, wherein the instantiating a server portion of the client-server application includes operations performed by or at one or more of the following block(s).

Block 3201 includes instantiating a database for execution on the first computing system, the database defined by the received string. The database represents the model in the MVC paradigm. Instantiating the database may include creating tables and associated database views for interacting with those tables, as specified by the received string. The received string may specify tables, relationships, integrity rules, and the like. The instantiated database may be shared by multiple users who are operating the client-server application executing on distinct computing systems. Other types of data sources or data management systems may of course be employed, such as file systems, device/sensor abstractions, or the like. The database may be hosted by the first computing system or in other cases be resident on a remote system.

Block 3202 includes instantiating a proxy application for execution on the first computing system, the proxy application configured to perform functions defined by the received string. The proxy application is the controller in the MVC paradigm. The proxy application includes functions specified by the received string for interacting with the database and/or performing stateless functions or operations.

FIG. 3C is an example flow diagram of example logic illustrating an example embodiment of process 3100 of FIG. 3A. More particularly, FIG. 3C illustrates a process 3300 that includes the process 3100, wherein the instantiating a server portion of the client-server application includes operations performed by or at one or more of the following block(s).

Block 3301 includes instantiating a server-side live data object for execution on the first computing system, wherein the live data object is configured to transmit the updates to a corresponding client-side live data object executing on the second computing system. As shown in FIG. 1A, the server (first computing system) hosts a live data object (proxy object) that interacts with a corresponding live data object executing on the client (second computing system). The server-side live data object is configured to forward data update notifications to the client-side live data object, which in turn may reflect the update on a corresponding client user interface.

FIG. 3D is an example flow diagram of example logic illustrating an example embodiment of process 3100 of FIG. 3A. More particularly, FIG. 3D illustrates a process 3400 that includes the process 3100, and which further includes operations performed by or at the following block(s).

Block 3401 includes determining that code corresponding to the server portion has been modified. In some embodiments, determining that the server portion code has been modified includes receiving a second string that represents the modified server portion. The second string is typically received in or during a software development process, in which a developer has modified the code module (e.g., Web page) to change the functionality of the client-server application. The process can then determine whether the code has been modified by comparing the string to a previously received string. In other embodiments, the client instead transmits a modification date, version number, and/or a digest (e.g., MD5 digest) to the server, which can be compared by the server to determine whether the client is in possession of modified code.

Block 3402 includes in response to determining that the code has been modified, automatically replacing the server portion with the modified server portion, such that a developer of the modified server portion need not manually access the server in order to stop, replace, and/or restart the server portion. In embodiments where the client always retransmits a string that defines the server portion, the process automatically re-initializes and restarts the server portion of the application based on the newly received string, including any corresponding database operations/structures. In embodiments where the client first transmits a modification date, version number, or code digest, the server may request that the client transmit the corresponding code, such as by transmitting a second string that defines the server code portion.

FIG. 3E is an example flow diagram of example logic illustrating an example embodiment of process 3100 of FIG. 3A. More particularly, FIG. 3E illustrates a process 3500 that includes the process 3100, and which further includes operations performed by or at the following block(s).

Block 3501 includes receiving the string a second time. The string may be received a second time from the second computing system or from some other computing system that is also executing the client-server application.

Block 3502 includes determining that the string is unchanged, and in response, not replacing or restarting the server portion. The process determines that the string is unchanged, such as by comparing it to the previously received string, by comparing hash values, or the like. Because the string is not changed, the process need not replace the server portion with a modified server portion, and in particular, it need not modify the data structures (e.g., database tables and views).

FIG. 3F is an example flow diagram of example logic illustrating an example embodiment of process 3100 of FIG. 3A. More particularly, FIG. 3F illustrates a process 3600 that includes the process 3100, wherein the receiving a string includes operations performed by or at one or more of the following block(s).

Block 3601 includes receiving the string from a Web client that executes on the second computing system and that loads a single page that defines both the client portion and the server portion, by defining a database, a proxy application, and a server-side live data object corresponding to the server portion. Examples of single pages are provided in program Listings 1-4, below. By packaging both the client and sever portions within a single page, software development efficiencies may be obtained. In particular, the developer can rapidly prototype the client-server application because the functionality, data structures, and interfaces between the client and server portions are all contained within a single, manageable, and comprehensible file.

FIG. 3G is an example flow diagram of example logic for facilitating development of client-server applications. More particularly, FIG. 3G illustrates a process 3700 that includes operations performed by or at the following block(s).

Block 3701 includes at a first computing system, instantiating a client-server application, by: performing operation(s) of block(s) 3702, 3703 and 3704, described below. This process implements an example of the application development model described herein, wherein a developer can efficiently code a client-server application in a single module (e.g., a Web page). As also discussed above, the client-server application is typically instantiated by a server computing system that hosts an example LDMS and that interacts with one or more clients.

Block 3702 includes providing a page that defines both a client portion and a server portion of the client-server application. The page may be provided by the first computing system or some other system, such as a separate Web server.

Block 3703 includes receiving a string from the client portion of the client-server application, the client portion executing on a second computing system, the string encoded with data used to mirror facilities of the client portion of the client-server application. The received string is typically encoded with instructions that define or otherwise specify the data structures and operations of the server portion of the client-server application. The received string is in some embodiments transmitted by a Web browser or other Web-capable client application executing on the second computing system. The string is transmitted by the second computing system in response to loading a page that includes code (e.g., JavaScript) that defines the client-server application.

Block 3704 includes instantiating a server portion of the client-server application based on the received string, the server portion executing on the first computing system and containing functions that are proxies for functions available in the client portion of the client-server application. Instantiating the server portion may include generating a session 106, along with corresponding proxy applications, objects, and database tables and views, as specified by the received string. If the server portion already exists (e.g., because it has been previously created by another client), then a session with a proxy application and related objects will be created, but new database structures will not.

FIG. 3H is an example flow diagram of example logic illustrating an example embodiment of process 3700 of FIG. 3G. More particularly, FIG. 3H illustrates a process 3800 that includes the process 3700, wherein the receiving a string includes operations performed by or at one or more of the following block(s).

Block 3801 includes receiving the string from a Web client executing on the second computing system, wherein the Web client loads the page and transmits the string to the first computing system, wherein the page includes code that defines the database and corresponding views, code that defines functions performed by the proxy application, and code that defines functions performed by the server-side live data object to transmit updates to the database to a client-side live data object that executes within the Web client. Examples of pages are provided in program Listings 1-4, below. As discussed above, application development efficiencies may be obtained by this approach.

FIG. 3I is an example flow diagram of example logic illustrating an example embodiment of process 3700 of FIG. 3G. More particularly, FIG. 3I illustrates a process 3900 that includes the process 3700, and which further includes operations performed by or at the following block(s).

Block 3901 includes determining that code corresponding to the server portion has been modified. As noted above, determining that the code has been modified may be performed in various ways, such as by receiving a second string that represents the server portion and comparing it to the previously received string; comparing version numbers; comparing hash values; comparing modification dates/times; or the like.

Block 3902 includes in response to determining that the code has been modified, automatically replacing the server portion with the modified server portion, such that a developer of the modified server portion need not manually access the server in order to stop, replace, and/or restart the server portion. The server portion may be automatically re-initialized based on a second string received by the client portion FIG. 3J is an example flow diagram of example logic illustrating an example embodiment of process 3900 of FIG. 3I. More particularly, FIG. 3J illustrates a process 31000 that includes the process 3900, and which further includes operations performed by or at the following block(s).

Block 31001 includes receiving from the second computing system a second string that represents the modified server portion. As noted above, in some embodiments the client (second) computing system will on every page load (or other condition) retransmit the string, modified or not. In other embodiments, the second string will be transmitted by the client computing system in response to a request from the first computing system, such as may be sent when the first computing system determines that the code has been modified, based on a comparison of version numbers, modification dates, code digests, or the like.

Block 31002 includes in response to receiving the second string, automatically replacing the server portion.

FIG. 3K is an example flow diagram of example logic illustrating an example embodiment of process 3700 of FIG. 3G. More particularly, FIG. 3K illustrates a process 31100 that includes the process 3700, and which further includes operations performed by or at the following block(s).

Block 31101 includes receiving an indication that the client-server application is in developer mode. Developer mode may be specified by a server-side configuration file or other mechanism, such as by providing a developer key as part the request transmitted by the second computing system Block 31102 includes in response to the received indication, automatically replacing the server portion every time the code corresponding to the server portion is modified. Techniques for conditionally replacing the server portion upon code modification are discussed above.

4. Example Computing System Implementation

Figure 4:
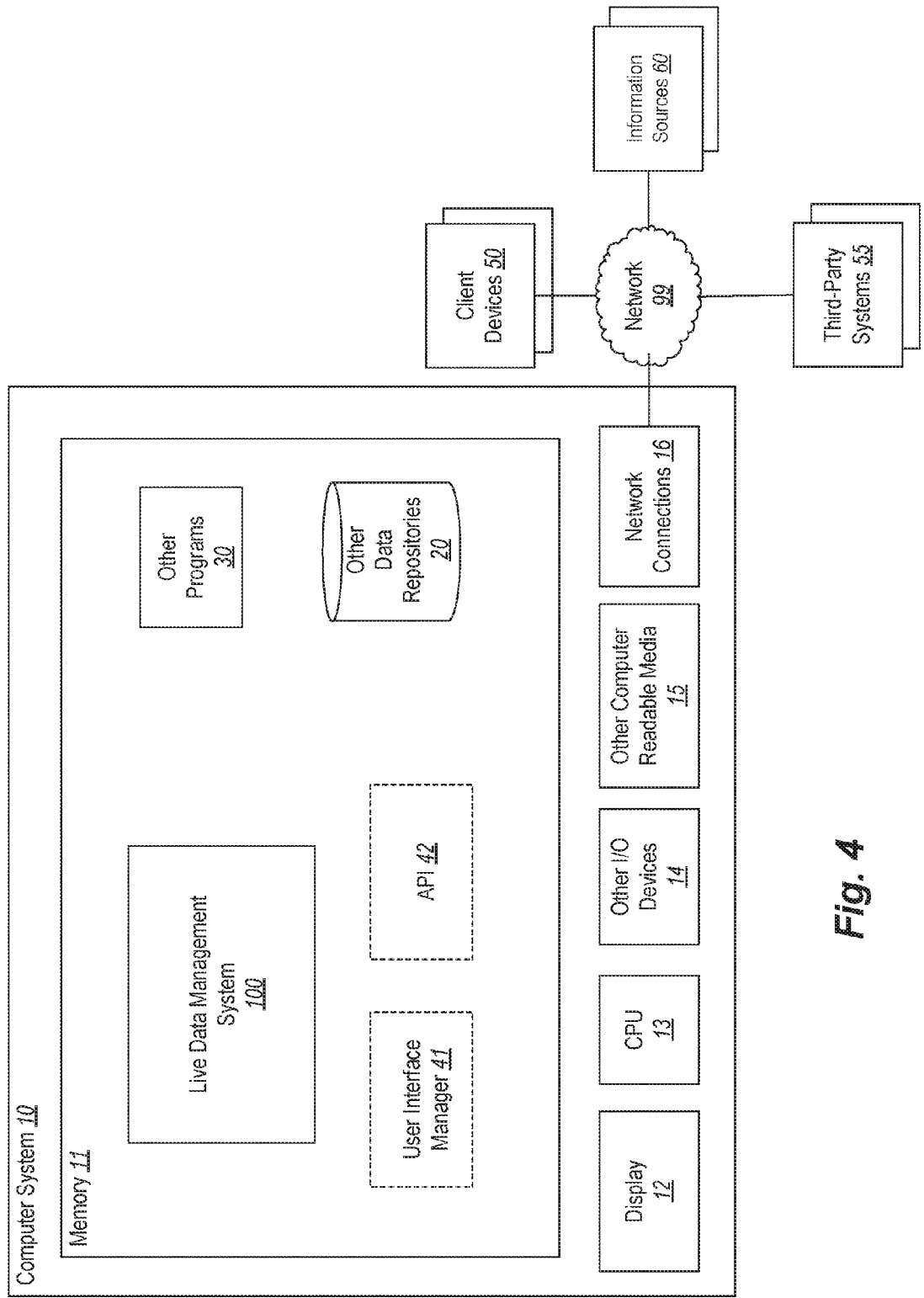
FIG. 4 is a block diagram of an example computing system for implementing a live data management system according to an example embodiment.

FIG. 4 is a block diagram of an example computing system for implementing a live data management system according to an example embodiment. In particular, FIG. 4 shows a computing system 10 that may be utilized to implement an LDMS 100. Note that one or more general purpose or special purpose computing systems/devices may be used to implement the LDMS 100. In addition, the computing system 10 may comprise one or more distinct computing systems/devices and may span distributed locations. Furthermore, each block shown may represent one or more such blocks as appropriate to a specific embodiment or may be combined with other blocks. Also, the LDMS 100 may be implemented in software, hardware, firmware, or in some combination to achieve the capabilities described herein.

In the embodiment shown, computing system 10 comprises a computer memory ("memory") 11, a display 12, one or more Central Processing Units ("CPU") 13, Input/Output devices 14 (e.g., keyboard, mouse, CRT or LCD display, and the like), other computer-readable media 15, and network connections 16. The LDMS 100 is shown residing in memory 11. In other embodiments, some portion of the contents, some or all of the components of the LDMS 100 may be stored on and/or transmitted over the other computer-readable media 15. The components of the LDMS 100 preferably execute on one or more CPUs 13 and perform the techniques described herein. Other code or programs 30 (e.g., an administrative interface, a Web server, and the like) and potentially other data repositories, such as data repository 20, also reside in the memory 11, and preferably execute on one or more CPUs 13. Of note, one or more of the components in FIG. 4 may not be present in any specific implementation. For example, some embodiments may not provide other computer readable media 15 or a display 12.

The LDMS 100 is shown executing in the memory 11 of the computing system 10. Also included in the memory are a user interface manager 41 and an application program interface ("API") 42. The user interface manager 41 and the API 42 are drawn in dashed lines to indicate that in other embodiments, functions performed by one or more of these components may be performed externally to the LDMS 100.

The LDMS 100 interacts via the network 99 with client devices 50, information sources 60, and third-party systems/applications 55. The network 99 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. The third-party systems/applications 55 may include any systems that provide data to, or utilize data from, the LDMS 100, including Web browsers, e-commerce sites, calendar applications, email systems, social networking services, and the like. The information sources 60 may include remote data repositories that are managed, monitored, or tracked by or via the LDMS 100. For example, the LDMS 100 may include live data objects (proxy objects) that reflect updates to data that is housed in one of the information sources 60.

The UI manager 41 provides a view and a controller that facilitate user interaction with the LDMS 100 and its various components. For example, the UI manager 41 may provide interactive access to the LDMS 100, such that users can interact with the LDMS 100, such as by configuring user accounts and/or permissions, monitoring the status of various data repositories managed by the LDMS 100, controlling processes, and the like. In some embodiments, access to the functionality of the UI manager 41 may be provided via a Web server, possibly executing as one of the other programs 30. In such embodiments, a user operating a Web browser executing on one of the client devices 50 can interact with the LDMS 100 via the UI manager 41.

The API 42 provides programmatic access to one or more functions of the LDMS 100. For example, the API 42 may provide a programmatic interface to one or more functions of the LDMS 100 that may be invoked by one of the other programs 30 or some other module. In this manner, the API 42 facilitates the development of third-party software, such as user interfaces, plug-ins, adapters (e.g., for integrating functions of the LDMS 100 into Web applications), and the like. In some embodiments, the API 42 is a REST ("Representational State Transfer") API that is accessed via HTTP.

In addition, the API 42 may be in at least some embodiments invoked or otherwise accessed via remote entities, such as code executing on one of the client devices 50, information sources 60, and/or one of the third-party systems/applications 55, to access various functions of the LDMS 100. In typical embodiments, all interaction between a client 50 and the LDMS 100 is performed via the API 42. As another example, one of the third-party systems 55 may utilize, via the API 42, the functions of the LDMS 100 to provide client-server applications to its own clients.

In an example embodiment, components/modules of the LDMS 100 are implemented using standard programming techniques. For example, the LDMS 100 may be implemented as a "native" executable running on the CPU 13, along with one or more static or dynamic libraries. In other embodiments, the LDMS 100 may be implemented as instructions processed by a virtual machine that executes as one of the other programs 30.

In general, a range of programming languages known in the art may be employed for implementing such example embodiments, including representative implementations of various programming language paradigms, including but not limited to, object-oriented (e.g., JAVA, C++, C#, Visual Basic. NET, Smalltalk, and the like), functional (e.g., ML, Lisp, Scheme, and the like), procedural (e.g., C, Pascal, Ada, Modula, and the like), scripting (e.g., PERL, RUBY, PYTHON, JAVASCRIPT, VBScript, and the like), and declarative (e.g., SQL, PROLOG, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the LDMS 100, such as data in the storage layer 120 (user and security data 122, session directory 124, and session data 126) and/or data repository 20, can be available by standard mechanisms such as through C, C++, C#, and JAVA APIs; libraries for accessing files, databases, or other data repositories; through scripting languages such as XML; or through Web servers, FTP servers, or other types of servers providing access to stored data. The illustrated data stores may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the LDMS 100 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

All of the above U.S. patents, U.S. patent application publications, U.S. patent applications, foreign patents, foreign patent applications, non-patent publications, and appendixes referred to in this specification and/or listed in the Application Data Sheet, including but not limited to U.S. application Ser. No. 14/842,676, filed Sep. 1, 2015 and entitled "LIVE DATA AS A SERVICE AND CORRESPONDING PROGRAMMING INFRASTRUCTURE," U.S. application Ser. No. 14/458,807, filed Aug. 13, 2014 and entitled "LIVE DATA AS A SERVICE AND CORRESPONDING PROGRAMMING INFRASTRUCTURE," and U.S. Provisional Patent Application No. 61/865,519, filed on Aug. 13, 2013 and entitled "LIVE DATA AS A SERVICE AND CORRESPONDING PROGRAMMING INFRASTRUCTURE," are incorporated herein by reference, in their entireties.

From the foregoing it will be appreciated that, although specific embodiments have been described herein for purposes of illustration, various modifications may be made without deviating from the spirit and scope of this disclosure. For example, the methods, techniques, and systems for live data management are applicable to other architectures or in other settings. For example, the live data management techniques may be used generally for client-server applications for monitoring or interacting with any kind of dynamic data, including power systems data, online games, personal information systems, calendar applications, or the like. Also, the methods, techniques, and systems discussed herein are applicable to differing protocols, communication media (optical, wireless, cable, etc.) and devices (e.g., desktop computers, wireless handsets, electronic organizers, personal digital assistants, tablet computers, portable email machines, game machines, pagers, navigation devices, etc.).

5. Computer Program Listings

The following program Listings 1-4 include code that respectively corresponds to the examples presented with respect to FIGS. 2A-2D, above.

| Listing 1 |
|---|

```
1.  <%@ page language="java" contentType="text/html; charset=UTF-8"
2.  pageEncoding="UTF-8"%>
3.  <%@ page import="com.powerdata.proxyclient.User"%>
4.  <% User u = User.GetCurrentUser(request); %>
5.  <html><head>
6.  <meta http-equiv="Content-Type" content="text/html; charset=UTF-8">
7.  <script src='proxyclient/jquery-1.9.1.js'></script>
8.  <script src='proxyclient/pdpc.js'></script>
9.  <script src='proxyclient/ldm.js'></script>
10. <title>Simple Chat</title>
11. <script>
12. /**
13.  * Create and configure an application instance named SChat
14.  */
15. Init("SChat").then(function(liveDataManager) {
16.     /** Load server side data and business logic */
17.     liveDataManager.defineServer(function( ) {
18.         /** Define the schema */
19.         this.tables = {
20.             chatMessage: {
21.                 cols:{
22.                     User:"String",
23.                     Message:"String"
24.                 }
25.             }
26.         };
27.         /** Define business entities */
28.         this.entities = {
29.             /** track each chat message */
30.             chatMessage:{
31.                 append:function(parms){
32.                     parms.User = user.getUsername( );
33.                     return db.append("chatMessage",parms);
34.                 }
35.             }
36.         };
37.     /**
38.      * Start the application
39.      */
40.     }).then(function(liveDataManager) {
41.         /** After the database is set up we can open the table or view */
42.         liveDataManager.getview("Table:chatMessage").then(function(tview) {
43.             // handler for new values
44.             tview.onSetValue.add(
45.                 function(tview,key,row,col,colname,coltype,value) {
46.                     if (colname == "User") {
47.                         addChatMessage(key,value,null);
48.                     } else if (colname == "Message") {
49.                         addChatMessage(key,null,value);
50.                     }
51.                 });
52.             // tell the view to send all data events
53.             tview.setObservable( );
54.         });
55.     });
56.     /** User event handler for entry new messages */
57.     $("#msg").change(function( ) {
58.         var msg = $("#msg").val( );
59.         liveDataManager.callHandler("chatMessage","append",{Message:msg});
60.         $("#msg").val("");
61.     });
62. });
63.
64. /**
65.  * UI function for adding values to the chat history.
66.  */
67. function addChatMessage(key,user,msg) {
68.     if ($("#hist"+key).length == 0) {
69.         $("#hist").append("<div id=\"hist"+key+"\"><span id=\"histu" + key +
70.             "\"></span><span id=\"histm"+key+"\"></span></div>");
71.         $("#hist").scrollTop($("#hist").height( ));
72.     }
73.     if (user) {
```

Listing 1

```
74.      color = (user == "<%=u.getUsername( )%>")?"#cc00cc":"#0000cc";
75.      $("#histu"+key).html("<font color='"+color+"'>"+user+":</font> ");
76.   } else if (msg) {
77.      $("#histm"+key).text(msg);
78.   }
79. }
80.
81. </script>
82. </head>
83. <body>
84. Logged in as <%=u.getUsername( )%>
85. <a href="public/login.jsp?logout=true">[logout]</a>
86. <h2>simple Chat</h2>
87. <div id="hist" style=" ... "></div>
88. <input id="msg" type="text" style="width:400px" /><br/>
89. </body>
90. </html>
```

Listing 2

```
1.  <%@ page language="java" contentType="text/html; charset=UTF-8"
2.     pageEncoding="UTF-8"%>
3.  <%@ page import="com.powerdata.proxyclient.User"%>
4.  <% User u = User.GetCurrentUser(request); %>
5.  <html><head>
6.  <meta http-equiv="Content-Type" content="text/html; charset=UTF-8">
7.  <script src='proxyclient/jquery-1.9.1.js'></script>
8.  <script src='proxyclient/pdpc.js'></script>
9.  <script src='proxyclient/ldm.js'></script>
10. <title>Simple Chat</title>
11. <script>
12. /**
13.  * Create an application instance named SChat
14.  */
15. Init("SChat").then(function(liveDataManager) {
16.      /** Load entity definitions to the server */
17.      liveDataManager.defineServer(function( ) {
18.          /** Define the schema */
19.          this.tables = {
20.             chatMessage: {
21.                cols:{
22.                   User:"String",
23.                   Message:"String"
24.                }
25.             }
26.          };
27.          /** Define DB Entities */
28.          this.entities = {
29.             /** track each chat message */
30.             chatMessage:{
31.                append:function(parms){
32.                   parms.User = user.getUsername( );
33.                   return db.append("chatMessage",parms);
34.                },
35.                clear:function(parms){
36.           var keys = db.ndxSearch("chatmessage","User",user.getUsername( ));
37.                   db.remove("chatMessage",keys);
38.                }
39.             }
40.          };
41.      }).then(function(liveDataManager) {
42.          /** After the database is set up we can open the table or view */
43.          liveDataManager.getView("Table:chatMessage").then(function(tview) {
44.             // handler for new values
45.             tview.onSetValue.add(
46.                function(tview,key,row,col,colname,coltype,value) {
47.                   if (colname == "User") {
48.                      addChatMessage(key,value,null);
49.                   } else if (colname == "Message") {
50.                      addChatMessage(key,null,value);
51.                   }
52.             });
53.             // handler for removed rows
54.             tview.onDeleteRow.add(function(tview,key) {
```

Listing 2 (continued)

```
55.            $("#hist"+key).remove( );
56.         });
57.         // tell the view to send all data events
58.         tview.setObservable( );
59.      });
60.   });
61.   /** User event handler for entery new messages */
62.   $("#msg").change(function( ) {
63.      var msg = $("#msg").val( );
64.      liveDataManager.callHandler("chatMessage","append",{Message:msg});
65.      $("#msg").val("");
66.   });
67.   /** User event handler for the clear button */
68.   $("#clear").click(function( ) {
69.      liveDataManager.callHandler("chatMessage","clear");
70.   });
71. });
72.
73. /**
74.  * UI function for adding values to the chat history.
75.  */
76. function addChatMessage(key,user,msg) {
77.   if ($("#hist"+key).length == 0) {
78.      $("#hist").append("<div id=\"hist"+key+"\"><span id=\"histu" + key +
79.         "\"></span><span id=\"histm"+key+"\"></span></div>");
80.      $("#hist").scrollTop($("#hist").height( ));
81.   }
82.   if (user) {
83.      color = (user == "<%=u.getUsername( )%>")?"#cc00cc":"#0000cc";
84.      $("#histu"+key).html("<font color='"+color+"'>"+user+":</font> ");
85.   } else if (msg) {
86.      $("#histm"+key).text(msg);
87.   }
88. }
89.
90. </script>
91. </head>
92. <body>
93. Logged in as <%=u.getUsername( )%>
94. <a href="public/login.jsp?logout=true">[logout]</a>
95. <h2>Simple Chat</h2>
96. <div id="hist" style=" ... "></div>
97. <input id="msg" type="text" style="width:400px" /><br/>
98. <button id="clear">Clear</button>
99. </body>
100. </html>
```

Listing 3

```
1.  <%@ page language="java" contentType="text/html; charset=UTF-8"
2.      pageEncoding="UTF-8"%>
3.  <%@ page import="com.powerdata.proxyclient.User"%>
4.  <% User u = User.GetCurrentUser(request); %>
5.  <html><head>
6.  <meta http-equiv="Content-Type" content="text/html; charset=UTF-8">
7.  <script src='proxyclient/jquery-1.9.1.js'></script>
8.  <script src='proxyclient/pdpc.js'></script>
9.  <script src='proxyclient/ldm.js'></script>
10. <title>Simple Chat</title>
11. <script>
12. /**
13. *Create and configure application instance named SChat
14. */
15. Init("SChat").then(function(liveDataManager) {
16.    /** Load entity definitions to the server */
17.    liveDataManager.defineServer(function( ) {
18.       /** Define the schema */
19.       this.tables = {
20.          chatMessage: {
21.             cols:{
22.                User:"String",
23.                Message:"String"
24.             }
25.          }
```

Listing 3

```
26.         };
27.         /** Define DB Entities */
28.         this.entities = {
29.           /** track each chatmessage */
30.           chatMessage:{
31.             append:function(parms){
32.               parms.User = user.getUsername( );
33.               return db.append("chatMessage",parms);
34.             },
35.             clear:function(parms){
36.               var keys = db.ndxSearch("chatMessage",
37.                           "User",user.getUsername( ));
38.               db.remove("chatMessage",keys);
39.             }
40.           }
41.         };
42.         /** Define Live Objects */
43.         this.liveObjects = {
44.           logs:{
45.             init:function(parms){
46.               server.monitorEvents("eventdb");
47.               client.dispatch("message",{type:"Log",msg:"Running ..."});
48.             },
49.             shutdown:function( ){ },
50.             refresh:function(time){ },
51.             eventcb:function(parms){
52.               if (parms.eventID == "UserLogIn" ||
53.                   parms.eventID == "UserLogOut") {
54.                 client.dispatch("message",
55.                           {type:parms.eventID,msg:parms.user});
56.               }
57.             }
58.           }
59.         };
60.       }).then(function(liveDataManager) {
61.         /** After the database is set up we can open the table or view */
62.         liveDataManager.getView("Table:chatMessage").then(function(tview) {
63.           // handler for new values
64.           tview.onSetValue.add(
65.             function(tview,key,row,col,colname,coltype,value) {
66.               if (colname == "User") {
67.                 addChatMessage(key,value,null);
68.               } else if (colname == "Message") {
69.                 addChatMessage(key,null,value);
70.               }
71.             });
72.           // handler for removed rows
73.           tview.onDeleteRow.add(function(tview,key) {
74.             $("#hist"+key).remove( );
75.           });
76.           // tell the view to send all data events
77.           tview.setObservable( );
78.         });
79.       });
80.       /** User event handler for entry new messages */
81.       $("#msg").change(function( ) {
82.         var msg = $("#msg").val( );
83.         liveDataManager.callHandler("chatMessage","append",{Message:msg});
84.         $("#msg").val("");
85.       });
86.       /** User event handler for the clear button */
87.       $("#clear").click(function( ) {
88.         liveDataManager.callHandler("chatMessage","clear");
89.       });
90.
91.       logger = null;
92.       $("#logopen").click(function( ) {
93.         liveDataManager.liveObject("logs",{ }).then(function(liveobj){
94.             logger = liveobj;
95.             logger.message = function(parms) {
96.               $("#event").html(parms.type+": "+parms.msg);
97.             };
98.         });
99.       });
100.      $("#logclose").click(function( ) {
101.        if (logger) logger.close( );
102.        $("#event").html("");
```

Listing 3

```
103.            logger = null;
104.        });
105. });
106.
107. /**
108.  * UI function for adding values to the chat history.
109.  */
110. function addChatMessage(key,user,msg) {
111.     if ($("#hist"+key).length == 0) {
112.         $("#hist").append("<div id=\"hist"+key+"\"><span id=\"histu" + key +
113.             "\"></span><span id=\"histm"+key+"\"></span></div>");
114.         $("#hist").scrollTop($("#hist").height( ));
115.     }
116.     if (user) {
117.         color = (user == "<%=u.getUsername( )%>")?"#cc00cc":"#0000cc";
118.         $("#histu"+key).html("<font color='"+color+"'>"+user+":</font> ");
119.     } else if (msg) {
120.         $("#histm"+key).text(msg);
121.     }
122. }
123.
124. </script>
125. </head>
126. <body>
127. Logged in as <%=u.getusername( )%>
128. <a href="public/login.jsp?logout=true">[logout]</a>
129. <h2>Simple Chat</h2>
130. <div id="hist" style=" ... "></div>
131. <input id="msg" type="text" style="width:400px" /><br/>
132. <button id="clear">Clear</button>
133. <button id="logopen">Start</button>
134. <button id="logclose">Stop</button>
135. <br/><br/>
136. <div id="event"></div>
137. </body>
138. </html>
```

Listing 4

```
1.  <%@ page language="java" contentType="text/html; charset=UTF-8"
2.      pageEncoding="UTF-8"%>
3.  <%@ page import="com.powerdata.proxyclient.User"%>
4.  <% User u = User.GetCurrentUser(request); %>
5.  <html><head>
6.  <meta http-equiv="Content-Type" content="text/html; charset=UTF-8">
7.  <script src='proxyclient/jquery-1.9.1.js'></script>
8.  <script src='proxyclient/pdpc.js'></script>
9.  <script src='proxyclient/ldm.js'></script>
10. <title>Simple Chat</title>
11. <script>
12. /**
13.  * Create and configure an application instance named SChat
14.  */
15. Init("SChat").then(function(liveDatamanager) {
16.     /** Load entity definitions to the server */
17.     liveDataManager.defineServer(function( ) {
18.         /** Define the schema */
19.         this.tables = {
20.             chatMessage: {
21.                 cols:{
22.                     PK_chatMessage:"PK",
23.                     User:"String",
24.                     Message:"String",
25.                     FK_chatRoom:"Long"
26.                 }
27.             },
28.             chatRoom: {
29.                 cols:{
30.                     PK_chatRoom:"PK",
31.                     Room:"String"
32.                 }
33.             }
34.         };
35.         /** Define the views */
```

-continued

| Listing 4 |
|---|

```
36.         this.views = {
37.            chat : [
38.               {scheme:"view",alias:"msg",table:"chatMessage"},
39.               {scheme:"view",alias:"rm",table:"chatRoom"},
40.               {scheme:"join",left:"msg.FK_chatRoom",right:"rm.PK_chatRoom"},
41.               {scheme:"proj",col:"User",exp:"msg.User"},
42.               {scheme:"proj",col:"Room",exp:"rm.Room"},
43.               {scheme:"proj",col:"Message",exp:"msg.Message"}
44.            ]
45.         };
46.         /** Define DB Entities */
47.         this.entities = {
48.            /** track each chat message */
49.            chatMessage:{
50.               append:function(parms){
51.                  parms.User = user.getUsername( );
52.                  if (!parms.Room) parms.Room = "Lobby";
53.                  parms.Fk_chatRoom = entities.chatRoom.upsert(parms);
54.                  return db.append("chatMessage",parms);
55.               },
56.               clear:function(parms){
57.                 var keys = db.ndxSearch("chatMessage","User",user.getUsername( ));
58.                  db.remove("chatMessage",keys);
59.               }
60.            },
61.            /** track chat rooms */
62.            chatRoom:{
63.               lookup:function(parms){
64.                  var keys = db.ndxsearch("chatRoom","Room",parms.Room);
65.                  return (keys[0])?keys[0]:0;
66.               },
67.               upsert:function(parms){
68.                  var keys = db.ndxsearch("chatRoom","Room",parms.Room);
69.                  var key = (keys[0])?keys[0]:db.append("chatRoom",parms);
70.                  console.log(key);
71.                  return key;
72.               },
73.               append:function(parms){
74.                  return entities.chatRoom.upsert(parms);
75.               },
76.               remove:function(parms){ }
77.            }
78.         };
79.         /** Define Live Objects */
80.         this.liveObjects = {
81.            logs:{
82.               init:function(parms){
83.                  server.monitorEvents("eventcb");
84.                  client.dispatch("message",{type:"Log",msg:"Running ..."});
85.               },
86.               shutdown:function( ){ },
87.               refresh:function(time){ },
88.               eventcb:function(parms){
89.                  if (parms.eventID == "UserLogIn" ||
90.                  parms.eventID == "UserLogOut") {
91.                     client.dispatch("message",
92.                                   {type:parms.eventID,msg:parms.user});
93.                  }
94.               }
95.            }
96.         };
97.      }).then(function(liveDataManager) {
98.         /** After the database is set up we can open the table or view */
99.         liveDataManager.getView("chat").then(function(tview) {
100.           // handler for new values
101.           tview.onSetValue.add(
102.              function(tview,key,row,col,colname,coltype,value) {
103.                 if (colname == "User") {
104.                    addChatMessage(key,value,null);
105.                 } else if (colname == "Message") {
106.                    addChatMessage(key,null,value);
107.                 }
108.           });
109.           // handler for removed rows
110.           tview.onDeleteRow.add(function(tview,key) {
111.                 $("#hist"+key).remove( );
112.           });
```

Listing 4

```
113.            // tell the view to send all data events
114.            tview.setObservable( );
115.        });
116.        /** Get the chat rooms */
117.        liveDataManager.getview("Table:chatRoom").then(function(tview) {
118.            // handler for new values
119.            tview.onSetValue.add(
120.                function(tview,key,row,col,colname,coltype,value) {
121.                    if (colname == "Room") {
122.                        $("#rooms").append("<div id='room" + key +
123.                            "' onclick='setRoom("+key+")'>"+value+"</div>");
124.                    }
125.            });
126.            // tell the view to send all data events
127.            tview.setObservable( );
128.        });
129.    });
130.    /** User event handler for entery new messages */
131.    $("#msg").change(function( ) {
132.        var msg = $("#msg").val( );
133.        liveDataManager.callHandler("chatMessage","append",{Message:msg});
134.        $("#msg").val("");
135.    });
136.    /** User event to add a new chat room */
137.    $("#room").change(function( ) {
138.        var rm = $("#room").val( );
139.        liveDataManager.callHandler("chatRoom","upsert",{Room:rm});
140.        $("#room").val("");
141.    });
142.    /** User event handler for the clear button */
143.    $("#clear").click(function( ) {
144.        liveDataManager.callHandler("chatMessage","clear");
145.    });
146.
147.    logger = null;
148.    $("#logopen").click(function( ) {
149.        liveDataManager.liveObject("logs",{ }).then(function(liveobj){
150.            logger = liveobj;
151.            logger.message = function(parms) {
152.                $("#event").html(parms.type+": "+parms.msg);
153.            };
154.        });
155.    });
156.    $("#logclose").click(function( ) {
157.        if (logger) logger.close( );
158.        $("#event").html("");
159.        logger = null;
160.    });
161. });
162.
163. /**
164.  * UI function for adding values to the chat history.
165.  */
166. function addChatMessage(key,user,msg) {
167.     if ($("#hist"+key).length == 0) {
168.         $("#hist").append("<div id=\"hist"+key+"\"><span id=\"histu" + key +
169.             "\"></span><span id=\"histm"+key+"\"></span></div>");
170.         $("#hist").scrollTop($("#hist").height( ));
171.     }
172.     if (user) {
173.         color = (user == "<%=u.getUsername( )%>")?"#cc00cc":"#0000cc";
174.         $("#histu"+key).html("<font color='"+color+"'>"+user+":</font> ");
175.     } else if (msg) {
176.         $("#histm"+key).text(msg);
177.     }
178. }
179.
180. </script>
181. </head>
182. <body>
183. Logged in as <%=u.getUsername( )%>
184. <a href="public/login.jsp?logout=true">[logout]</a>
185. <h2>SimpleChat</h2>
186. <table>
187. <tr>
188. <td><div id="hist" style=" ... "></div></td>
189. <td><div id="rooms" style=" ..."></div></td>
```

Listing 4

```
190. </tr>
191. <tr>
192. <td><input id="msg" type="text" style="width:400px" /></td>
193. <td><input id="room" type="text" style="width:200px" /></td>
194. </tr>
195. </table>
196. <br/>
197. <button id="clear">Clear</button>
198. <button id="logopen">Start</button>
199. <button id="logclose">Stop</button>
200. <br/><br/>
201. <div id="event"></div>
202. </body>
203. </html>
```

The invention claimed is:

1. A method for providing client-server applications in a Web-based environment, the method comprising:
at a first computing system, instantiating a client-server application, by:
receiving a string for a first time from a client portion of the client-server application, wherein the client portion of the client-server application executes on a second computing system, and wherein the received string is encoded with data used to mirror facilities of the client portion of the client-server application;
instantiating a server portion of the client-server application based on the received string, wherein the server portion of the client-server application executes on the first computing system and contains functions that are proxies for functions available in the client portion of the client-server application, and wherein both the client portion of the client-server application and the server portion of the client-server application are defined by a page loaded by the second computing system;
monitoring changes to data from a data source in accordance with the functions of the server portion of the client-server application;
determining that code corresponding to the server portion of the client-server application has been modified; and
in response to determining that the code corresponding to the server portion of the client-server application has been modified, automatically replacing the server portion of the client-server application with the modified code corresponding to the server portion of the client-server application, such that a user associated with the modified code corresponding to the server portion of the client-server application need not manually access a server in order to stop, replace, and/or restart the server portion of the client-server application.

2. The method of claim 1, further comprising:
receiving an indication that the client-server application is in developer mode; and
in response to the received indication, automatically replacing the server portion of the client-server application with modified code every time the code corresponding to the server portion of the client-server application is modified.

3. The method of claim 1, further comprising:
storing the instantiated server portion of the client-server application in a cache on the first computing system; and
replacing the instantiated server portion of the client-server application in the cache when it is determined that the code corresponding to the server portion of the client-server application has been modified.

4. The method of claim 1, further comprising:
receiving the string for a second time; and
determining that the received string is unchanged, and in response, not replacing or restarting the server portion of the client-server application.

5. The method of claim 1, further comprising:
automatically forwarding updates to the data from the data source to the client portion of the client-server application, without receiving polling requests from the client portion of the client-server application.

6. The method of claim 1, wherein the monitoring changes to the data from the data source includes creating a live data object to receive updates to the data from the data source.

7. The method of claim 6, wherein the live data object is configured to track changes to an underlying database, file, or sensor, and wherein the received string specifies types of data events captured by the live data object.

8. The method of claim 1, wherein the instantiating a server portion of the client-server application includes:
instantiating a database for execution on the first computing system, wherein the database is defined by the received string, and wherein the database is instantiated based on tables, relationships, and integrity rules specified by the received string; and
instantiating a proxy application for execution on the first computing system, wherein the proxy application is configured to perform functions defined by the received string.

9. The method of claim 1, wherein the instantiating a server portion of the client-server application includes:
instantiating a server-side live data object for execution on the first computing system, and wherein the server-side live data object is configured to transmit updates to a corresponding client-side live data object executing on the second computing system.

10. The method of claim 1, wherein the receiving a string includes: receiving the string from a Web client that executes on the second computing system and that loads a single page that defines both the client portion of the client-server application and the server portion of the client-server application, by defining a database, a proxy application, and a server-side live data object corresponding to the server portion of the client-server application.

11. The method of claim 10, wherein the single page includes: code that defines the database and corresponding views, code that defines functions performed by the proxy application, and code that defines functions performed by the server-side live data object to transmit updates from the database to a client-side live data object that executes within the Web client.

12. A system for providing client-server applications in a Web-based environment, the system comprising:
   a first computing system having:
      a processor;
      a memory; and
      a module that is stored in the memory and that is configured, when executed by the processor, to instantiate a client-server application, by:
         receiving a string for a first time from a client portion of the client-server application, wherein the client portion of the client-server application executes on a second computing system, and wherein the received string is encoded with data used to mirror facilities of the client portion of the client-server application;
         instantiating a server portion of the client-server application based on the received string, wherein the server portion of the client-server application executes on the first computing system and contains functions that are proxies for functions available in the client portion of the client-server application, and wherein both the client portion of the client-server application and the server portion of the client-server application are defined by a page loaded by the second computing system;
         monitoring changes to data from a data source in accordance with the functions of the server portion of the client-server application;
         determining that code corresponding to the server portion of the client-server application has been modified; and
         in response to determining that the code corresponding to the server portion of the client-server application has been modified, automatically replacing the server portion of the client-server application with the modified code corresponding to the server portion of the client-server application, such that a user associated with the modified code corresponding to the server portion of the client-server application need not manually access a server in order to stop, replace, and/or restart the server portion of the client-server application.

13. The system of claim 12, wherein the client portion of the client-server application and the server portion of the client-server application communicate via Hypertext Transfer Protocol (HTTP).

14. The system of claim 12,
   wherein the first computing system is further configured to:
      automatically forward updates to the data from the data source to the client portion of the client-server application, without receiving polling requests from the client portion of the client-server application; and
   wherein the second computing system is configured to:
      receive a page that includes instructions that specify both the client portion of the client-server application and the server portion of the client-server application, wherein the page is a single Web page that is processed by a Web client on the second computing system and that includes scripts defining the client portion of the client-server application and server portion of the client-server application;
      transmit the data from the data source to the first computing system;
      receive the updates from the first computing system; and
      present information about the received updates on a user interface that is defined by the page.

15. The system of claim 12, wherein the server portion of the client-server application includes a live data object that is configured to select, filter, and manage updates to the data source on behalf of the client portion of the client-server application.

16. The system of claim 12, wherein the data source is a database that is configured by the first computing system based on received data, and wherein the received data defines a table and at least one corresponding database view.

17. The system of claim 12, wherein the server portion of the client-server application includes:
   a session manager configured to manage and track multiple server portions of the client-server application that each interact with distinct client computing systems;
   a database executing on the first computing system, wherein the database includes tables and views that are specified by received data;
   a proxy application executing on the first computing system, wherein the proxy application is configured to perform functions specified by the received data; and
   a server-side live data object executing on the first computing system, wherein the server-side live data object is configured to transmit updates to a corresponding client-side live data object executing on the second computing system.

18. A non-transitory computer-readable medium storing instructions that are configured, when executed, to cause a computing system to perform a method for providing client-server applications in a Web-based environment, the method comprising:
   at a server computing system, instantiating a client-server application, by:
      receiving a string for a first time from a client portion of the client-server application, wherein the client portion of the client-server application executes on a client computing system, and wherein the received string is encoded with data used to mirror facilities of the client portion of the client-server application;
      instantiating a server portion of the client-server application based on the received string, wherein the server portion of the client-server application executes on the server computing system and contains functions that are proxies for functions available in the client portion of the client-server application, and wherein both the client portion of the client-server application and the server portion of the client-server application are defined by a page loaded by the client computing system;
      monitoring changes to data from a data source in accordance with the functions of the server portion of the client-server application;
      determining that code corresponding to the server portion of the client-server application has been modified; and
      in response to determining that the code corresponding to the server portion of the client-server application has been modified, automatically replacing the server portion of the client-server application with the modified code corresponding to the server portion of the client-server application, such that a user associated with the modified code corresponding to the server portion of the client-server application need not manually access a server in order to stop, replace, and/or restart the server portion of the client-server application.

19. The non-transitory computer-readable medium of claim 18, wherein the method further comprises:
automatically forwarding updates to the data from the data source to the client portion of the client-server application, without receiving polling requests from the client portion of the client-server application.

* * * * *